US008537679B2

(12) United States Patent
Baruah et al.

(10) Patent No.: US 8,537,679 B2
(45) Date of Patent: Sep. 17, 2013

(54) LOAD BALANCING PSEUDOWIRE ENCAPSULATED IPTV CHANNELS OVER AGGREGATED LINKS

(75) Inventors: Pritam Baruah, San Jose, CA (US); Rishi Mehta, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 78 days.

(21) Appl. No.: 12/116,954

(22) Filed: May 8, 2008

(65) Prior Publication Data
US 2009/0279431 A1   Nov. 12, 2009

(51) Int. Cl.
*H04J 1/16* (2006.01)
*H04J 3/16* (2006.01)
*H04L 12/28* (2006.01)

(52) U.S. Cl.
USPC ............ 370/235; 370/230; 370/389; 370/437

(58) Field of Classification Search
USPC ................. 370/231–235, 389, 437, 390, 401, 370/469, 432, 230, 229, 412
See application file for complete search history.

(56) References Cited

U.S. PATENT DOCUMENTS

| | | | | |
|---|---|---|---|---|
| 6,553,030 B2 * | 4/2003 | Ku et al. | ......................... | 370/390 |
| 8,194,664 B2 * | 6/2012 | Dharwadkar | .................. | 370/392 |
| 2005/0169270 A1 * | 8/2005 | Mutou et al. | .................... | 370/390 |
| 2007/0071233 A1 * | 3/2007 | Zak | .................................. | 380/28 |
| 2007/0118616 A1 * | 5/2007 | Simongini et al. | ............. | 709/219 |
| 2008/0002690 A1 * | 1/2008 | Ver Steeg et al. | .............. | 370/390 |

OTHER PUBLICATIONS

Cisco, Configuring Cisco Express Forwading , Feb. 2005.*

* cited by examiner

*Primary Examiner* — Yemane Mesfin
*Assistant Examiner* — Samina Choudhry
(74) *Attorney, Agent, or Firm* — Blakely, Sokloff, Taylor & Zafman

(57) ABSTRACT

A method for load balancing IPTV channels is described. In one embodiment of the invention, a first Provider Edge (PE) network element of a label switched network, coupled with a second PE network element over multiple member links of an aggregate link, receives IPTV packets. For each IPTV packet received, the first PE network determines layer 3 information of the IPTV packet, and generates one or more channel load balancing keys based on the layer 3 information. The PE network element generates a hash value from the channel load balancing keys and determines which one of multiple member links to transmit the IPTV packet on based on the hash value, and transmits the IPTV packet to the second PE network element on the determined member link. Other methods and apparatuses are also described.

15 Claims, 5 Drawing Sheets

CHANNEL LOAD BALANCING MEMBER LINK IDENTIFIER STRUCTURE 320

| HASH VALUE 506 | MEMBER LINK ID 608 |
|---|---|
| 1 | MEMBER LINK 250 |
| 2 | MEMBER LINK 252 |
| 3 | MEMBER LINK 252 |
| 4 | MEMBER LINK 250 |
| 5 | MEMBER LINK 254 |
| 6 | MEMBER LINK 254 |

FIG. 6

GENERATED HASH VALUES 500

| SRC IP ADDR 502 | DEST IP ADDR 504 | HASH VALUE 506 |
|---|---|---|
| 10.1.1.2 | 224.1.1.1 | 1 |
| 10.1.1.2 | 224.1.1.2 | 2 |
| 10.1.1.2 | 224.1.1.3 | 3 |
| 10.1.1.2 | 224.1.1.4 | 4 |
| 10.1.1.2 | 224.1.1.5 | 5 |
| 10.1.1.2 | 224.1.1.6 | 6 |

FIG. 5

LOAD BALANCING PSEUDOWIRE ENCAPSULATED IPTV CHANNELS OVER AGGREGATED LINKS

BACKGROUND

1. Field

Embodiments of the invention relate to the field of network processing; and more specifically, to load balancing IPTV channels over aggregate links.

2. Background

Internet Protocol Television (IPTV) may be transmitted through an Ethernet network (e.g., IP based broadcast TV). Typically a source of the IPTV is coupled with a headend router, which is typically coupled with an Internet Protocol/Multiprotocol Label Switching (IP/MPLS) network. A label switched network is typically coupled with the IP/MPLS network. Each network element in the label switched network typically acts as a Provider Edge (PE) network element for one or more access network elements that replicate IP traffic (e.g., digital subscriber line access multiplexer (DSLAM)). The PE network elements in the layer 2 label switched network are each coupled with one or more MPLS pseudowires. Each pseudowire may, and often does, carry multiple IPTV channels.

The label switched network is typically a layer 2 network (layer 2 is the data link layer as defined in the Open Systems Interconnection Basic Reference Model (OSI Model) (ISO/IEC 7498-1, Nov. 15, 1994). Typical network elements (e.g., PE network elements) in the label switched network do not perform processing beyond layer 2 or beyond MPLS processing (sometimes referred to as layer 2.5). Thus, typical network elements in the label switched network do not perform layer 3 processing (layer 3 is the network layer as defined in the OSI model) (e.g., determining routing decisions based on layer 3 IP addresses). Typical network elements in the label switched network base their forwarding decisions on MPLS labels encapsulated in the IPTV packets.

Customer premise equipment (CPE) (e.g., set-top boxes (STB)) issue Internet Group Management Protocol (IGMP) (defined in RFC 1112, RFC 2236, and RFC 3376) messages that indicate request for membership into a group. Each group corresponds to an IPTV channel and is identified by a multicast group IP address. In addition, all members of a certain group receive IPTV channel data in form of IP packets.

The physical links between the network elements in the layer 2 label switched network may be aggregate links conforming to clause 43 of the Institute of Electrical and Electronics Engineers (IEEE) standard 802.3 (Dec. 9, 2005) (informally known as the 802.3ad Link Aggregation standard). An aggregate link includes multiple physical member links. Each physical member link may have different characteristics (e.g., differing amounts of bandwidth, etc.). Aggregate links are used to protect against link failures (e.g., line card failures) by providing redundancy (e.g., if one member link fails, another member link may be used). In addition, aggregate links provide more bandwidth across physical endpoints (e.g., multiple member links may be used to transmit traffic concurrently). Each pseudowire in the layer 2 label switched network typically is transmitted over these aggregate links. Thus, packets from a single pseudowire may be transmitted from one PE network element to another PE network element over multiple physical links.

BRIEF DESCRIPTION OF THE DRAWINGS

The invention may best be understood by referring to the following description and accompanying drawings that are used to illustrate embodiments of the invention. In the drawings:

FIG. 5 is an exemplary list of generated hash values based on layer 3 information according to one embodiment of the invention; and FIG. 6 is an exemplary channel load balancing member link identifier structure according to one embodiment of the invention.

DETAILED DESCRIPTION

Figure 1:
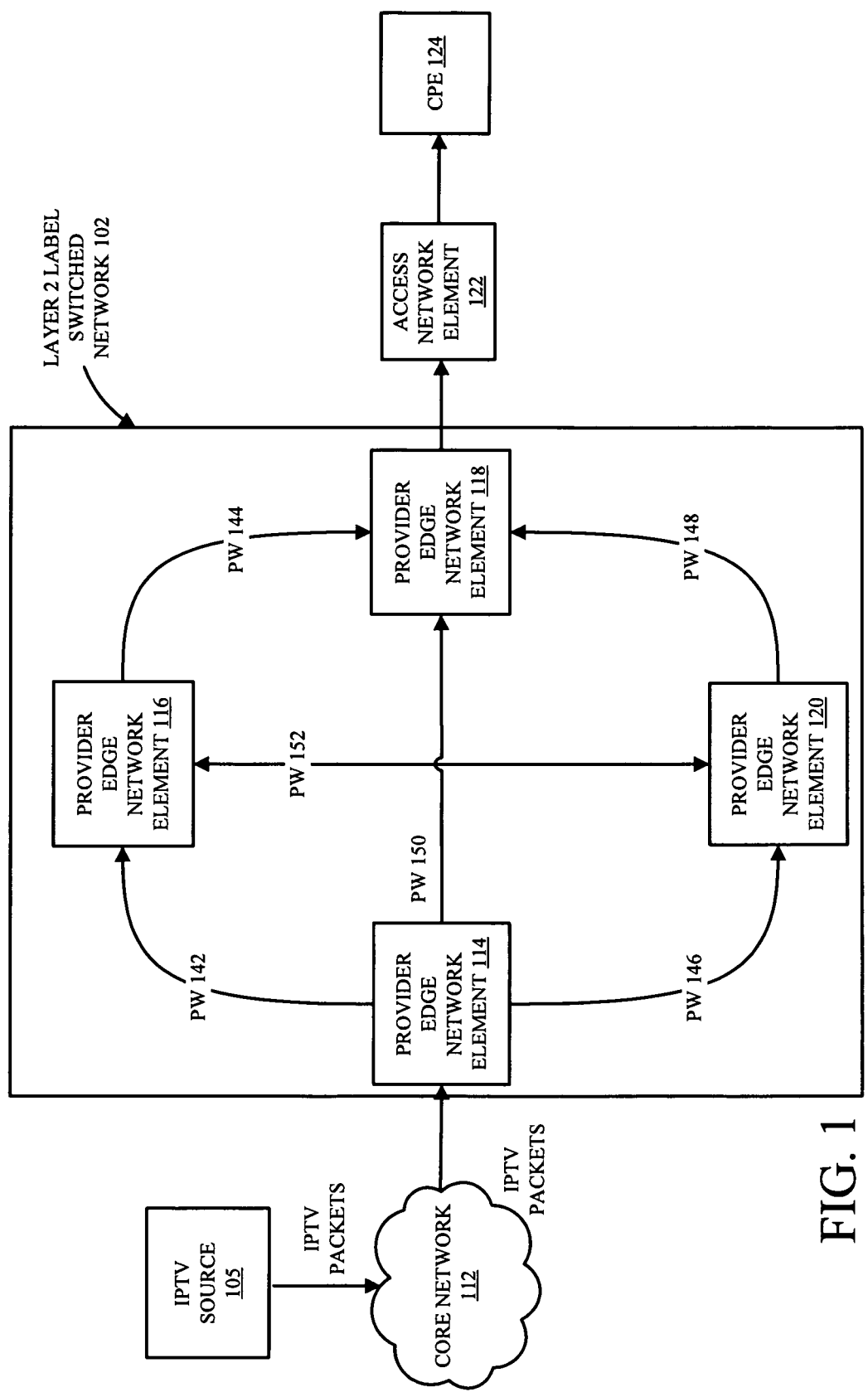
FIG. 1 illustrates an exemplary IPTV network according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., a computer, a network element, etc.). Such electronic devices store and communicate (internally and with other electronic devices over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software that communicatively interconnects other equipment on the network (e.g., other network elements, computer end stations, etc.). Subscriber computer end stations (e.g., workstations, laptops, palm tops, mobile phones, etc.) access content/services provided over the Internet and/or content/services provided on virtual private networks (VPNs) overlaid on the Internet. The content and/or services are typically provided by one or more server computing end stations belonging to a service or content provider, and may include public webpages (free content, store fronts, search services, etc.), private webpages (e.g., username/password accessed webpages providing email services, etc.), corporate networks over VPNs, etc. Typically, subscriber computing end stations are coupled (e.g., through customer premise equipment coupled to an access network, wirelessly to an access network) to edge network elements, which are coupled through core network elements of the Internet to the server computing end stations.

Some network elements support the configuration of multiple contexts. As used herein, each context includes one or more instances of a virtual network element (e.g., a virtual router or a virtual bridge). Each context typically shares one or more computing resources (e.g., memory, processing cycles, etc.) with other contexts configured on the edge network element, yet is independently administrable. For example, in the case of multiple virtual routers, each of the virtual routers shares computing resources, but is separate from those other virtual routers regarding its management domain, authentication, authorization, and accounting (AAA) name space, IP address, and routing database(es).

An edge network element is a type of network element positioned at the edge of an autonomous system that communicatively interconnects a number of core network elements of that autonomous system with other equipment belonging to other autonomous systems. As used herein, an autonomous system is a set of one or more network elements (edge and/or core network elements) under the control of one or more network service providers that singularly presents a common routing policy to a common network (e.g., Internet). A Provider Edge (PE) network element is a type of edge network element situated at the edge of the provider's network. A Customer Edge (CE) network element is a type of edge network element located at the customer premise and typically communicates with PE network elements.

A method and apparatus for load balancing IPTV channels is described. In one embodiment of the invention, a PE network element acting as ingress of the label switched network (e.g., an ingress Label Edge Router) receives IPTV packets. For each IPTV packet received, the PE network element determines which outgoing member link transmits the IPTV packet based on layer 3 information of the IPTV packet. In another embodiment of the invention, a PE network element acting as a transit network element of the switched aggrega- tion network (e.g., a Label Switch Router) receives those IPTV packets previously IPTV channel load balanced. For each IPTV packet received, the transit PE network element determines which outgoing member link to transmit the IPTV packet on based on the incoming slot and port information and the MPLS label stack of the packet.

FIG. 1 illustrates an exemplary IPTV network according to one embodiment of the invention. FIG. 1 will be described with reference to the exemplary embodiments of FIGS. 2-4. However, it should be understood that the operation of FIG. 1 can be performed by embodiments of the invention other than those discussed with reference to FIGS. 2-4, and the embodiments discussed with reference to FIGS. 2-4 can perform operations different than those discussed with reference to FIG. 1.

FIG. 1 includes an IPTV source 105 (i.e., the source of IPTV packets) coupled with a core network 112. The IPTV source 105 transmits IPTV packets to the core network 112. While according to some embodiments of the invention the core network 112 is an IP core network, in alternative embodiments of the invention the core network 112 is a MPLS core network, or a combination of IP and MPLS. The core network 112 includes one or more network elements (not illustrated for simplicity reasons) which collectively transmit IPTV packets to the layer 2 label switched network 102. In one embodiment of the invention, an IPTV source may be directly coupled with one or more PE network elements.

The layer 2 label switched network 102 includes provider edge network elements 114, 116, 118, and 120. The PE network element 114 is coupled with the PE network elements 116, 118 and 120 via the pseudowires 142, 150, and 146 respectively. The PE network element 116 is coupled with the PE network elements 118 and 120 via the pseudowires 144 and 152 respectively. The PE network element 120 is coupled with the PE network element 118 via the pseudowire 148.

The label switched network 102 is coupled with the access network element 122. According to one embodiment of the invention, the access network element 122 is a network element that may replicate IP traffic (e.g., a DSLAM, Multi-tenant unit, etc.). The access network element 122 is coupled with the customer premise equipment (CPE) 124. The CPE 124 (e.g., set top box) issues IGMP join messages that indicate a request for membership into a group (each group corresponds to an IPTV channel).

As illustrated in FIG. 1, the core network 112 transmits IPTV packets to the PE network element 114. Thus, the PE network element 114 is an ingress into the layer 2 label switched network (e.g., the PE network element 114 is an ingress label edge network element). Since the IPTV packets exit the layer 2 switched network 102 from the PE network element 118, the PE network element 118 is an egress label edge network element. The intermediary PE network elements (e.g., PE network elements 116 and 120) are each transit label switched network elements.

Typically the IPTV packets received by the PE network element 114 are not associated with a label (i.e., the packets are not encapsulated with one or more labels). The PE network element 114 adds labels as appropriate and forwards the packets to others of the layer 2 label switched network 102. It should be understood that the choice of which PE network element the PE network element 114 forwards the IPTV packets to is predetermined before the PE network element 114 receives those IPTV packets (e.g., forwarded according to a label switched path (LSP) established before IPTV packets are received). The establishment of the LSP is typically established through use of a signaling protocol (e.g., Label Distribution Protocol (LDP) defined in Request for Comments (RFC) 3036, January 2001, or Resource Reservation Protocol (RSVP) defined in RFC 2205, September 1997). Thus, since the PE network element 114 bases its forwarding decision on which PE network element is to receive the IPTV packets on the established LSP, the PE network element 114 does not base its forwarding decision to forward IPTV packets to a certain one of the PE network elements based on layer 3 information included in each IPTV packet (e.g., IP address information). It should be understood that the core network 112 may also transmit IPTV packets to other PE network elements of the layer 2 label switched network 102 (e.g., for redundancy purposes).

Figure 2:
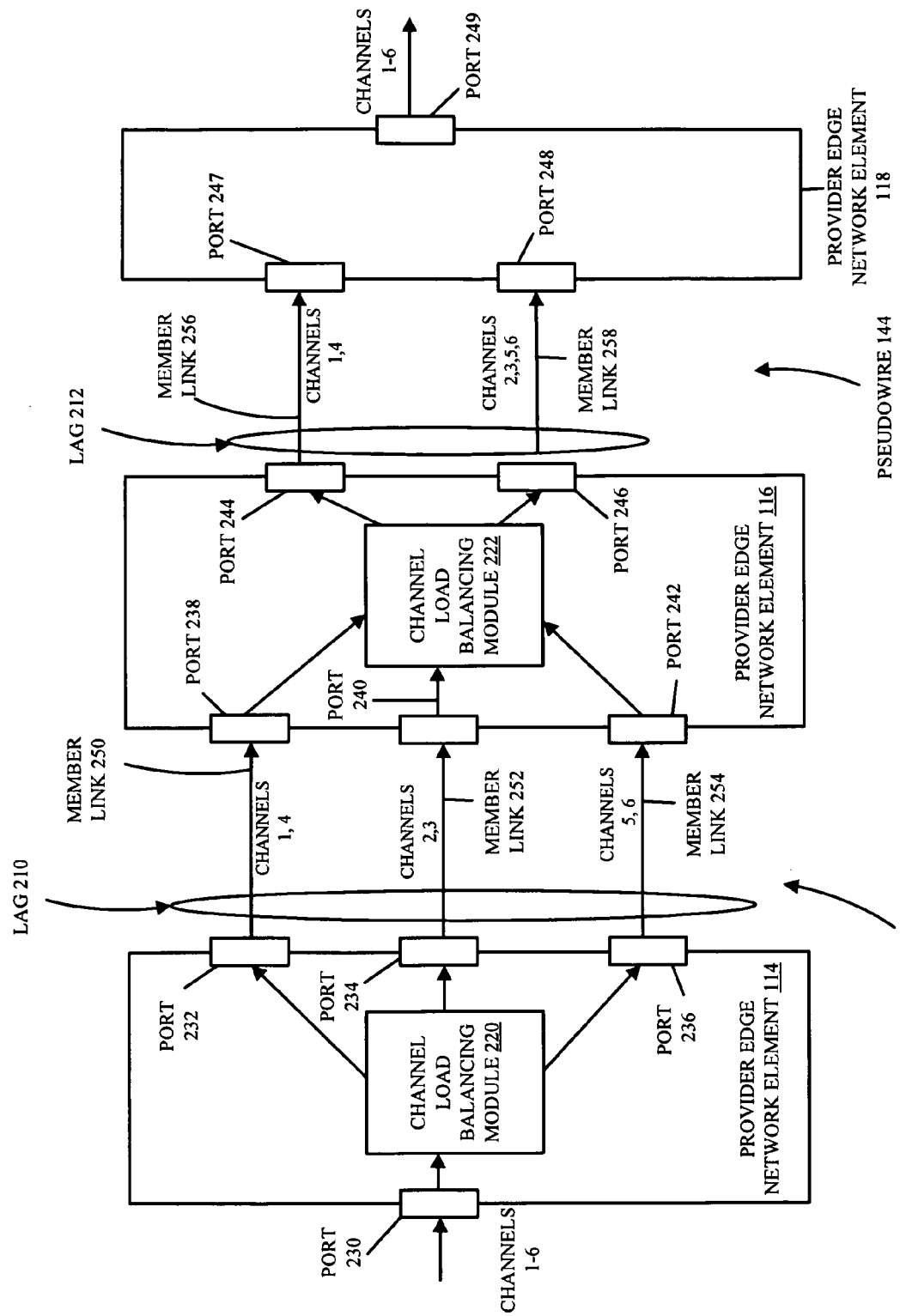
FIG. 2 is an exploded view of a portion of a layer 2 label switched network illustrated in FIG. 1 illustrating IPTV channel load balancing according to one embodiment of the invention.

FIG. 2 is an exploded view of a portion of a layer 2 label switched network illustrated in FIG. 1 illustrating IPTV channel load balancing according to one embodiment of the invention. FIG. 2 includes the provider edge network elements 114, 116, and 118 illustrated in FIG. 1. The pseudowire 142 coupling the PE network element 114 with the PE network element 116 is carried over aggregate links (e.g., over the member links 250, 252, and 254). Similarly, the pseudowire 144 coupling the PE network element 116 with the PE network element 118 is carried over aggregate links (e.g., over the member links 256 and 258). According to one embodiment of the invention, the link aggregation of the member links, represented by the link aggregation groups (LAG) 210 and 212, conform to clause 43 of the IEEE 802.3 standard (informally known as the 802.3ad Link Aggregation standard).

The PE network element 114 receives IPTV packets (e.g., IPTV channels 1-6) from the core network 112 at the port 230. However, it should be understood that in alternative embodiments of the invention the PE network element 114 receives IPTV packets on multiple ports. The channel load balancing module 220 of the PE network element 114 load balances the channels over the member links 250, 252, and 254 (which will be described in greater detail with reference to FIG. 3). For example, channels 1 and 4 are transmitted over the member link 250 via the port 232, channels 2 and 3 are transmitted over the member link 252 via the port 234, and channels 5 and 6 are transmitted over the member link 254 via the port 236.

The PE network element 116 receives those channel load balanced IPTV packets on the ports 238, 240, and 242 respectively. In order to ensure integrity of end-to-end load balancing in the layer 2 switched network, the PE network element 116 also performs load balancing on channels of its member links. Thus, the channel load balancing module 222 of the PE network element 116 load balances the channels over the member links 256 and 258. For example, channels 1 and 4 are transmitted over the member link 256 via the port 244, and the channels 2, 3, 5, and 6 are transmitted over the member link 258. It should be understood that although the number of ports on which IPTV packets are transmitted on differ between the PE network elements 114 and 116 (i.e., PE network element 114 transmits IPTV packets on 3 egress ports and PE network element 116 transmits IPTV packets on 2 egress ports), in alternative embodiments of the invention the number of ports are the same.

The PE network 118 receives those channel load balanced IPTV packets on the ports 247 and 248 respectively. The PE network element 118 performs any processing necessary on those packets and forwards those channels to the access network element 122 via the port 249.

Figure 3:
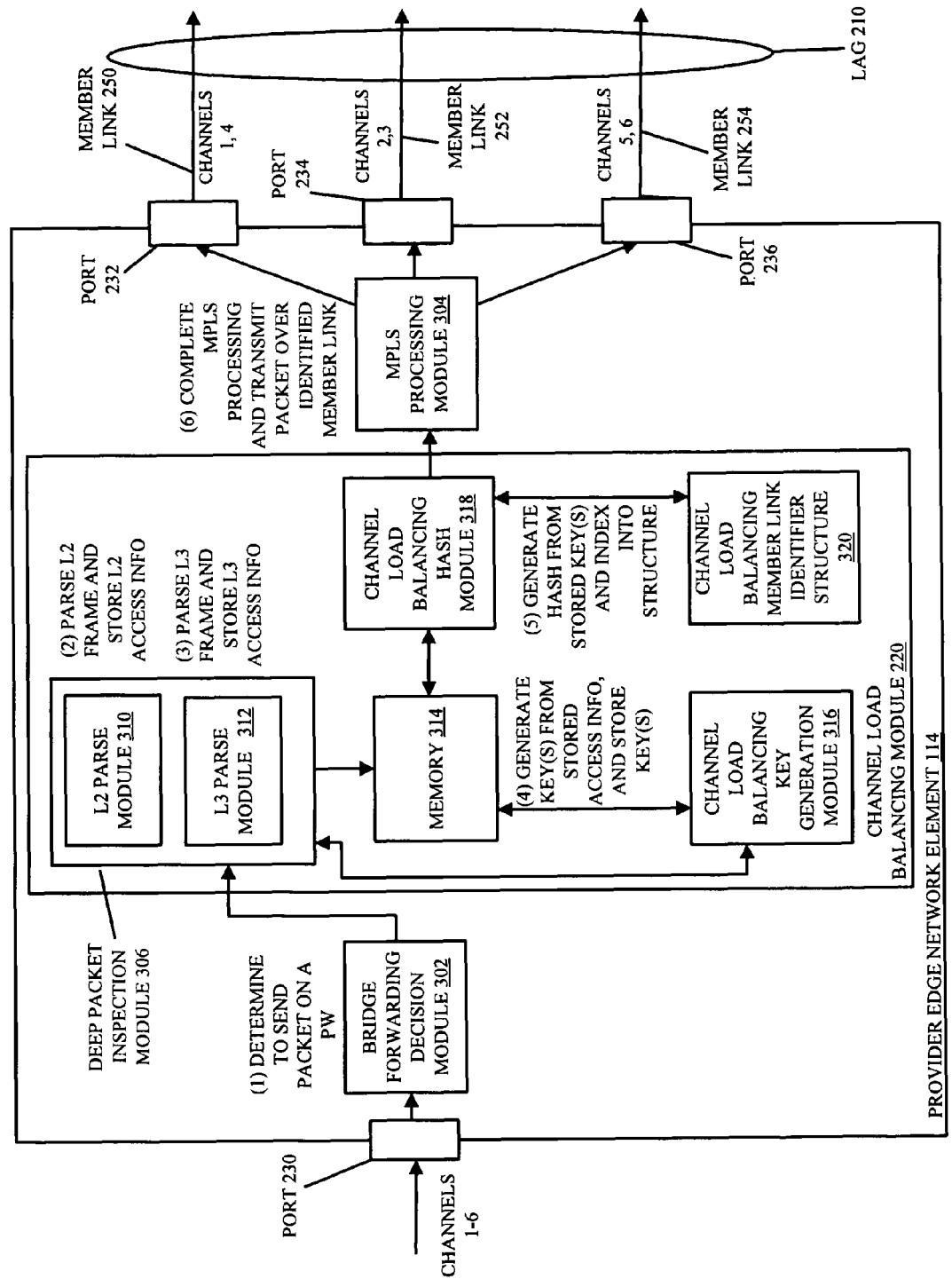
FIG. 3 is a data flow diagram illustrating a PE network element acting as an ingress into the layer 2 label switched network performing IPTV channel load balancing according to one embodiment of the invention.

FIG. 3 is a data flow diagram illustrating a PE network element acting as an ingress into the layer 2 label switched network performing IPTV channel load balancing according to one embodiment of the invention. Similarly as described with reference to FIG. 2, the PE network element 114 receives IPTV packets (e.g., channels 1-6) at the port 230. For each packet received, the bridge forwarding decision module 302 determines that the packet needs to be sent on a pseudowire. For example, based on the source and destination MAC address of the packet, and a lookup in a bridge forwarding table, the bridge forwarding decision module 302 determines that the packet needs to be sent on a pseudowire. Thus, the bridge forwarding decision module 302 performs at the data link layer (layer 2) of the OSI model. Thus, at an operation 1, the bridge forwarding decision module 302 determines to send a packet (the packet corresponding to one of the channels 1-6) on a pseudowire.

If channel load balancing is enabled in the PE network element 114, then the channel load balancing module 220 performs channel load balancing prior to the MPLS processing (e.g., adding one or more labels to the label stack of the packet, determining layer 2 egress encapsulation information, etc.). According to one embodiment of the invention, a user of the PE network element 114 (e.g., a network administrator) configures the network element to enable the channel load balancing feature (e.g., through use of a command line interface (CLI)). The control plane receives this configuration, and programs the data plane (i.e. forwarding plane) with the channel load balancing module 220. According to one embodiment of the invention, the control plane causes a flag to be set which enables the channel load balancing module 220 to perform channel load balancing.

As illustrated in FIG. 3, the channel load balancing feature is enabled (thus, the channel load balancing module 220 performs channel load balancing). Therefore, the channel load balancing module 220 intercepts the packet before the packet is processed by the MPLS processing module 304. The channel load balancing module 220 includes a deep packet inspection module 306, which includes a layer 2 parse module 310 and a layer 3 parse module 312. The deep packet inspection module 306 is coupled with a memory 314, and a channel load balancing key generation module 316. The channel load balancing module 220 also includes the channel load balancing hash module 318 coupled with the memory 314 and the channel load balancing member link identifier structure 320.

IPTV channel information cannot be determined based on layer 2 information and/or label stack information (e.g., source and destination MAC addresses and/or pseudowire and/or transport labels). However, IPTV channel information may be determined based on layer 3 information (e.g., source and destination IP address). For example, the source IP address identifies the source of the IPTV channel and the destination IP address identifies the IPTV channel. In order to determine the layer 3 information, the layer 2 portion of the packet must be parsed prior to parsing the layer 3 information. Thus, at operation 2, the deep packet inspection module 306 (via the layer 2 parse module 310) parses the layer 2 frame (i.e., the layer 2 portion of the IPTV packet as processed by the bridge forwarding decision module 302, e.g., an Ethernet frame) and stores information on how to access the layer 2 information of the frame (e.g., source and destination MAC address) in the memory 314. For example, the stored access information may include packet pointers and/or header lengths identifying the beginning portion and ending portion of the layer 2 information. In an alternative embodiment of the invention, layer 2 access information is not saved in memory.

It should be understood that in addition to bridge forwarding decision module 302 parsing the layer 2 encapsulation, the deep packet inspection module 306 parses the layer 2 encapsulation again (e.g., source and destination MAC address) because the bridge forwarding decision module 302 may modify the layer 2 encapsulation (e.g., the bridge forwarding decision module 302 may add or remove Ethernet tags from the layer 2 encapsulation). While in some embodiments of the invention the memory 314 is a memory allocated for the packet (e.g., packet meta-data storage), in alternative embodiments of the invention the memory 314 is different (e.g., a memory local to the processing unit or process that is handling the packet, a shared memory accessible to multiple processing units, etc.). The memory 314 may take a variety of forms in different embodiments of the invention including non-volatile memory (e.g., hard disk, optical disk, flash, phase change memory (PCM), etc.) and volatile memory (e.g., DRAM, SRAM, etc.). The layer 2 access information may be used during later processing of the channel load balancing and/or by different process(es) for different reasons (e.g., debugging).

Sometime later, at operation 3, the deep packet inspection module 306 (via the layer 3 parse module 312) parses the layer 3 portion of the IPTV packet (e.g., the IP source and destination address) and stores information on how to access the layer 3 information in the memory 314. Similar to the storing of the layer 2 access information, the stored layer 3 access information may be used during later processing of the channel load balancing and/or by different process(es) for different reasons (e.g., debugging). The layer 3 parsing uses the results of layer 2 parsing (e.g., the location of the layer 3 encapsulation, the size of the layer 2 header, and the type of layer 3 protocol). In an alternative embodiment of the invention, layer 3 access information is stored in one or more processor registers for faster access to the layer 3 access information.

After the layer 2 parse module 310 and the layer 3 parse module 312 have operated, the deep packet inspection module 306 signals the channel load balancing key generation module 316 to operate. It should be understood that the channel load balancing key generation module 316 is not required to operate immediately after it receives the signal from the deep packet inspection module 306. For example, other processes may be performed (not shown in FIG. 3 for simplicity purposes) between the deep packet inspection module 306 and the channel load balancing key generation module 316.

Thus, sometime later, according to one embodiment of the invention, at operation 4, the channel load balancing key generation module 316 generates one or more channel load balancing keys based on the stored layer 3 access information, and stores those generated keys in the memory 314. For example, the keys may be a representation of the source and destination IP addresses (i.e., two keys of 32 bits each) of the IPTV packet. Of course, different formats of the channel load balancing keys are within the scope of the invention.

If the channel load balancing key generation module 316 cannot locate the stored layer 3 access information (e.g., if the layer 3 parse module failed to locate a layer 3 source and destination address), according to one embodiment of the invention the channel load balancing key generation module 316 generates keys based on the stored layer 2 access information. Of course, it should be understood that if the keys are not based on the layer 3 information, there is no guarantee that the packet will be load balanced according to the channel (the channel will be unknown).

Sometime later, at operation 5, the channel load balancing hash module 318 generates a hash value from the stored keys, and uses that hash value as an index into the channel load balancing member link identifier structure 320. While in some embodiments of the invention the channel load balancing member link identifier structure 320 is stored in the memory 314, in alternative embodiments of the invention, the channel load balancing member link identifier structure 320 is stored in a different memory which may or may not be local to the channel load balancing module 220 (e.g., non-volatile memory (e.g., hard disk, optical disk, flash, phase change memory (PCM), etc.), volatile memory (e.g., DRAM, SRAM, etc.)). According to one embodiment of the invention, the channel load balancing member link identifier structure 320 provides a mapping from the hash value to a member link. For example, FIG. 5 is an exemplary list of generated hash values 500 based on layer 3 information (e.g., source and destination IP addresses). Thus, the source IP address field 502 indicates the source IP address of the IPTV packet, the destination IP address field 504 indicates the destination IP address of the IPTV packet, and the hash value field 506 indicates the hash value based on the source and destination IP address. FIG. 6 is an exemplary channel load balancing member link identifier structure 320 according to one embodiment of the invention. The hash value field 506 indicates the value of the hash, and the member link identifier field 608 indicates the member link associated with a hash value. According to the exemplary channel load balancing member link identifier structure 320, the hash values 1 and 4 are associated with the member link 250, the hash values 2 and 3 are associated with the member link 252, and the hash values 5 and 6 are associated with the member link 254. Thus, the hash value, based on layer 3 information of the packet, determines which member link the IPTV packet is transmitted on.

It should be understood that the decision on populating the channel load balancing member link identifier structure 320 is not necessarily arbitrary. For example, certain IPTV channels (exemplary represented with a hash value) may be associated with certain member links due to bandwidth considerations. For example, certain IPTV channels may require more bandwidth than other IPTV channels (e.g., a high definition channel requires more bandwidth than a standard definition channel). Since the member links may differ in bandwidth characteristics (e.g., maximum amount of bandwidth), a channel with a high bandwidth requirement may be transmitted on a high bandwidth member link, while a channel with a lower bandwidth requirement may be transmitted on a lower bandwidth member link. Of course, other factors may also be taken into consideration (e.g., quality of service levels for certain channels, quality of service levels for certain subscribers, etc.).

After determining the hash, and which member link the IPTV packet will be transmitted on, the channel load balancing module 220 passes the determined member link to the MPLS processing module 304. At operation 6, the MPLS processing module 304 completes MPLS processing (e.g., adding appropriate labels for the pseudowire and the LSP, adding layer 2 egress encapsulation information, etc.) and transmits the packet over the determined member link.

Thus, unlike a typical PE network element in a label switched network which may perform load balancing on the label stack or layer 2 information, the PE network element 114 performs load balancing on IPTV channels based on layer 3 information of the packet. It should be understood that only using the label stack information to load balance results in all channels from a single source being routed over a single member link. Of course, if a failure affects that single member link (e.g., line card failure), the subscriber loses all of the channels from that source (assuming there is no other backup protection in the network element). Additionally, transmitting all of the traffic on a single member link does not take advantage of the available bandwidth offered by the aggregate link.

On the other hand, load balancing IPTV channels on multiple member links makes better use of the available bandwidth of the aggregate link.

Additionally, unlike other load balancing schemes which may transmit IPTV packets from a single channel over multiple member links, according to one embodiment of the invention, each IPTV packet of a single channel is transmitted on the same member link. For example, each IPTV packet of the IPTV channel 4 (exemplary represented by the hash value 4 with reference to FIGS. 5 and 6) is transmitted on the member link 250. It should be understood that transmitting IPTV packets from the same channel over multiple member links may have undesirable consequences such as affecting quality of service guarantees for a particular channel and/or a subscriber (e.g., since member links often have differing characteristics (e.g., bandwidth, cost, etc.), and makes performing debugging more difficult. For example, if subscribers encounter a problem with a particular channel, a network administrator typically performs debugging for each of the member links that carry that channel. Thus, if IPTV packets of a single channel are transmitted on the same member link, the debugging process is simplified (i.e., a network administrator performs debugging on a single member link instead of multiple member links). In addition, in case of one of the member links failing (e.g., line card failing), only those links which are carried on that member link are affected.

While embodiments of the invention require determining layer 3 information of the IPTV packet in addition to typical IPTV packet processing in a layer 2 label switched network (e.g., determining layer 2 information and MPLS processing), the additional computational cost is minor. For example, unlike layer 3 processing where a layer 3 lookup is performed for routing purposes (e.g., a lookup in a routing table), certain embodiments of the invention only require parsing the layer 3 portion of the IPTV packet. In other words, in certain embodiments of the invention, the layer 3 information is not used during a layer 3 lookup for a routing decision. Additionally, in certain embodiments of the invention, the location of the layer 3 information is stored and other processes (e.g., processes in addition to channel load balancing) may access that layer 3 information.

Figure 4:
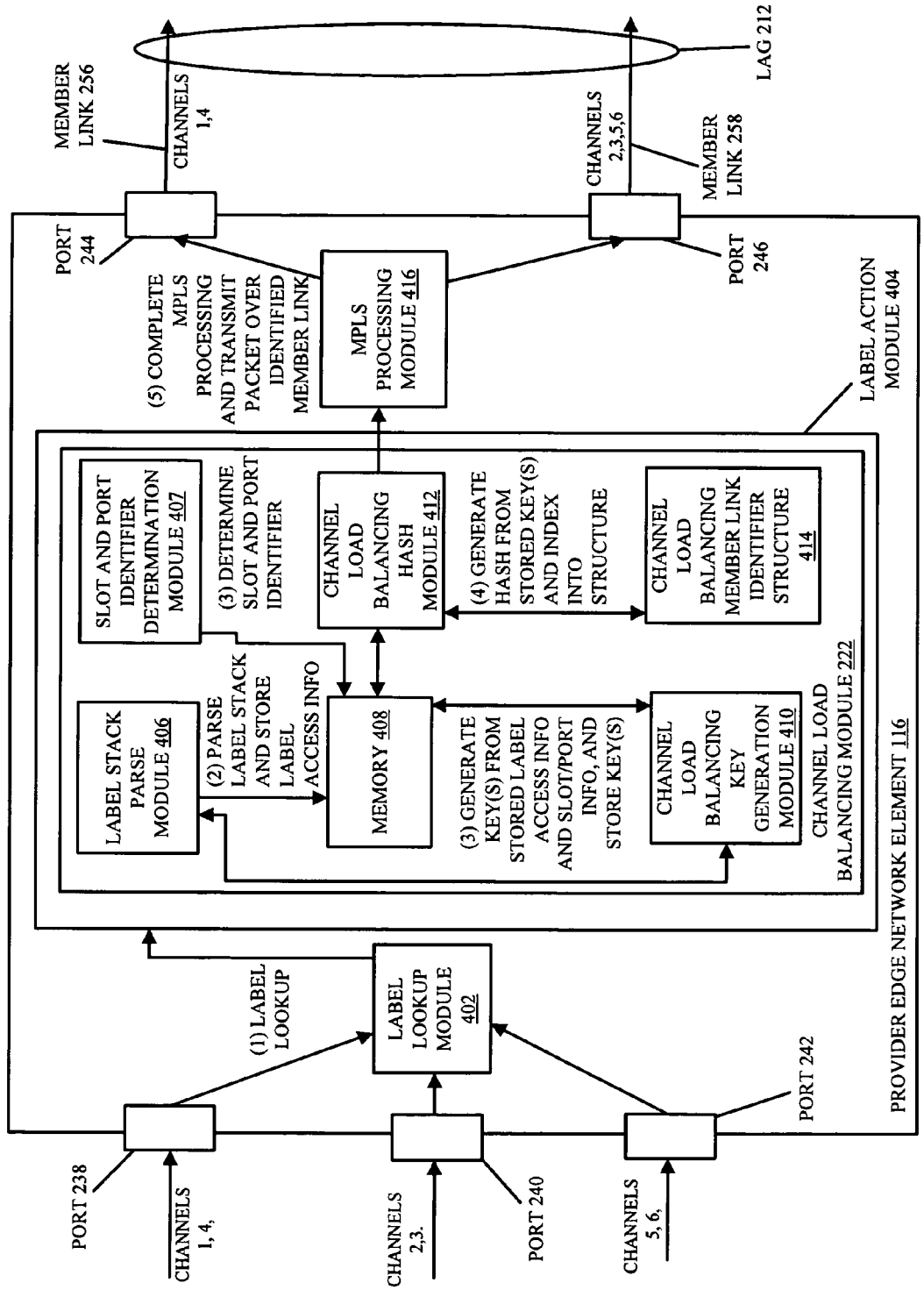
FIG. 4 is a data flow diagram illustrating a PE network element acting as a transit of the layer 2 label switched network performing IPTV channel load balancing according to one embodiment of the invention.

In order to ensure integrity of end-to-end load balancing in the layer 2 switched network, transit PE network elements also perform channel load balancing across their member links. FIG. 4 is a data flow diagram illustrating the PE network element 116 performing IPTV channel load balancing according to one embodiment of the invention. The PE network element 116 includes a label lookup module 402 coupled with a label action module 404, which is coupled with the MPLS processing module 416. The PE network element 116 receives channel load balanced IPTV packets on the ports 238, 240, and 242 respectively. It should be understood that these packets include are encapsulated with a label stack (one or more labels).

For each packet received, at operation 1, the label lookup module 402 performs a label lookup operation. For example, according to one embodiment of the invention, the label lookup module 402 parses the incoming packet to determine the incoming label. The label lookup module 402 then uses the incoming label as an index into a label forwarding information base (LFIB). The LFIB will indicate one or more label actions to take for the incoming label. According to one embodiment of the invention, the label actions include channel load balancing. Thus, the label action module 404 includes the channel load balancing module 222.

The channel load balancing module 222 includes a label stack parse module 406 coupled with a memory 408 and a channel load balancing key generation module 410, a slot and port identifier determination module 407 coupled with the memory 408, and a channel load balancing hash module 412 coupled with a channel load balancing member link identifier structure 414. At operation 2, the label stack parse module 406 parses the label stack of the incoming packet to determine a location of the label(s) (e.g., through use of pointers and/or headers) and stores the locations in the memory 408. At operation 3, the slot and port identifier determination module 407 determines the slot and port that the packet was received on. In other words, the slot and port identifier determination module 407 determines which line card, and which port on the line card, the packet was received on. According to one embodiment of the invention, the slot and port are determined from packet meta-data. In an alternative embodiment of the invention, the slot may be determined from a global slot attribute data structure stored in slot memory. In a similar fashion as the label information, according to one embodiment of the invention the slot and port information is stored in the memory 408. While in some embodiments of the invention the memory 408 is a memory allocated for the packet (e.g., packet meta-data storage), in alternative embodiments of the invention the memory 408 is different (e.g., a memory local to the processing unit or process that is handling the packet, a shared memory accessible to multiple processing units, etc.). The memory 408 may take a variety of forms in different embodiments of the invention including non-volatile memory (e.g., hard disk, optical disk, flash, phase change memory (PCM), etc.) and volatile memory (e.g., DRAM, SRAM, etc.).

At operation 4, the channel load balancing key generation module 410 generates one or more channel load balancing keys based on the stored label access information and the stored slot and port information, and stores those generated keys in the memory 408. Sometime later, at operation 5, the channel load balancing hash module 412 generates a hash value based on the stored keys, and uses the generated hash value as an index into the channel load balancing member link identifier structure 414. While in some embodiments of the invention the channel load balancing member link identifier structure 414 is stored in the memory 408, in alternative embodiments of the invention, the channel load balancing member link identifier structure 414 is stored in a different memory which may or may not be local to the channel load balancing module 222 (e.g., non-volatile memory (e.g., hard disk, optical disk, flash, phase change memory (PCM), etc.), volatile memory (e.g., DRAM, SRAM, etc.)). According to one embodiment of the invention, the channel load balancing member link identifier structure 414 provides a mapping from the hash value to a member link (e.g., one of the member links 256 and 258). According to one embodiment of the invention, each IPTV packet received on a single slot and port for a particular pseudowire is transmitted on the same member link.

It should be understood that populating the channel load balancing member link identifier structure 414 may be performed in a similar fashion as populating the channel load balancing member link identifier structure 320. For example, certain IPTV channels (exemplary represented with a hash value) may be associated with certain member links due to bandwidth considerations. For example, certain IPTV channels may require more bandwidth than other IPTV channels (e.g., a high definition channel requires more bandwidth than a standard definition channel). Since the member links may differ in bandwidth characteristics (e.g., maximum amount of bandwidth), a channel with a high bandwidth requirement may be transmitted on a high bandwidth member link, while a channel with a lower bandwidth requirement may be transmitted on a lower bandwidth member link. Of course, other factors may also be taken into consideration (e.g., quality of service levels for certain channels, quality of service levels for certain subscribers, etc.).

After determining the hash, and which member link the IPTV packet will be transmitted on, the channel load balancing module 222 passes the determined member link to the MPLS processing module 416. At operation 6, the MPLS processing module 416 completes MPLS processing (e.g., switching labels for LSP, adding layer 2 encapsulation information on egress, etc.) and transmits the packet over the determined member link.

Referring back to FIGS. 1 and 2, the channel load balanced IPTV packets are transmitted to the PE network element 118 (e.g., over the member links 256 and 258 respectively), and the PE network element 118 transmits those IPTV packets to the access network element 122, and the access network element 122 transmits those IPTV packets to the CPE 124.

Thus, in addition to load balancing IPTV channels on an aggregate link of an ingress network element of the layer 2 label switched network, according to one embodiment of the invention, transit network elements in the layer 2 label switched network also load balance IPTV channels on its aggregate link. Thus, according to one embodiment of the invention, IPTV packets are channel load balanced from the ingress of the layer 2 label switched network through the transit network elements of the layer 2 label switched network to the egress of the layer 2 label switched network. Thus, there is end-to-end (ingress to egress) channel load balancing. Thus, service level agreements depending on bandwidth for a particular subscriber or particular channel may be maintained and consistent throughout the layer 2 label switched network.

According to one embodiment of the invention, if channel load balancing was not performed at the PE network element 114 (i.e., if channel load balancing was not performed at the ingress network element), the PE network element 116 may perform channel load balancing in a similar fashion as described in reference to FIG. 3. For example, the PE network element 116 may perform channel load balancing based on layer 3 information of labeled packets it receives. Thus, IPTV channel load balancing based on layer 3 information is not limited to ingress network elements.

According to one embodiment of the invention, one or all of the PE network elements in the layer 2 label switched network 102 support the configuration of multiple contexts providing support for IPTV processing. For example, the PE network element 114 may include multiple contexts each supporting IPTV processing, each with one or more instances of a virtual network element (e.g., virtual bridge). Each instance of the virtual network element is independently administrable and is separate regarding its implementation of channel load balancing. For example, one context may provide support for IPTV channel load balancing, while another context may not provide support for IPTV channel load balancing (e.g., this virtual network element may perform other load balancing techniques).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A computer implemented method for load balancing Internet Protocol Television (IPTV) channels in a layer 2 label switched network, wherein a first one of a plurality of network elements in the layer 2 label switched network is coupled with a second one of the plurality of network elements over a plurality of member links of an aggregate link, wherein the first network element transmits IPTV packets of the IPTV channels over the plurality of member links to the second network element, and wherein the first network element does not base its forwarding decision to forward IPTV packets to the second network element based on layer 3 information of those packets, said method comprising:

receiving, at the first network element, a plurality of IPTV packets originating from a single source, wherein each of the received IPTV packets belongs to one of a plurality of IPTV channels; and for each IPTV packet received, the first network element performing the following, determining layer 3 information included in the IPTV packet, generating one or more first channel load balancing keys based on the layer 3 information, generating a first hash value from the first channel load balancing keys, determining which one of the plurality of member links to transmit the IPTV packet on based on the first hash value, and transmitting the IPTV packet to the second network element on the determined member link, wherein each IPTV packet of a certain IPTV channel is transmitted on a same member link in the plurality of member links, wherein transmitting the IPTV packet further includes encapsulating the IPTV packet with a label stack including one or more labels, wherein the second network element to perform the following upon receiving channel load balanced IPTV traffic from the first network element, for each IPTV packet received, performing the following, determining a slot identifier and a port identifier from which the IPTV packet was received on;

generating one or more second channel load balancing keys based on the labels included in the IPTV packet and the slot and port identifier, generating a second hash value from the second channel load balancing keys, determining which of another plurality of member links to transmit the IPTV packet based on the second has value; and transmitting the IPTV packet to the third network element on the determined member link from the another plurality of member links between the second network element and the third network element.

2. The computer implemented method of claim 1, wherein the determining layer 3 information further includes performing the following, parsing the received IPTV packet to determine a location in the packet of layer 3 information, and storing the location of the layer 3 information in memory.

3. The computer implemented method of claim 2, wherein parsing the packet further includes determining a location of a source IP address and a location of a destination IP address of the packet, wherein the destination IP address identities one of the IPTV channels.

4. The computer implemented method of claim 1, wherein determining which one of the plurality of member links to transmit the IPTV packet on includes using the first hash value to lookup the member link in a channel load balancing member link identifier structure.

5. The computer implemented method of claim 1, wherein each IPTV packet received on a certain slot and port is transmitted on the same member link.

6. The computer implemented method of claim 5, further comprising,
parsing the label stack to determine a location in the packet of the labels, and
storing the location of the labels and the slot and port identifier.

7. A network element to load balance Internet Protocol Television (IPTV) channels across a single aggregate link of a layer 2 label switched network wherein the network element is to transmit IPTV packets of the IPTV channels over a plurality of member links of the single aggregate link to another network element in the layer 2 label switched network, and wherein the network element is to act as a transit network element in the layer 2 label switched network, said network element comprising:
a processor configured to execute a label lookup module, a channel load balancing module and a multiprotocol label switching (MPLS) processing module,
the label lookup module to receive IPTV packets encapsulated with a label stack of one or more labels, and to determine that a label action for the label stack that includes channel load balancing,
the channel load balancing module coupled with the label lookup module, the channel load balancing module including,
a label stack parse module to parse the label stack of the received IPTV packets to determine values of the labels,
a slot and port identifier determination module to determine the slot and port identifiers associated with the IPTV packets,
a channel load balancing key generation module to generate one or more channel load balancing keys based on the labels and the slot and port identifiers for each received IPTV packet, and
a channel load balancing hash module to generate a hash value for each received IPTV packet based on the generated channel load balancing keys and to determine for each of the received IPTV packets which one of the plurality of member links to transmit the IPTV packet on based on the hash value, and
the MPLS processing module coupled with the channel load balancing module, the MPLS processing module to perform MPLS processing on the IPTV packet, and to cause the IPTV packet to be transmitted over the determined member link.

8. The network element of claim 7, wherein the channel load balancing hash module is to determine that each IPTV packet received on a certain slot and port is to be transmitted on the same member link.

9. The network element of claim 8, wherein the network element is to receive IPTV packets that are channel load balanced.

10. A non-transitory machine-readable storage medium that provides instructions that, if executed by a processor, will cause said processor to perform operations for load balancing Internet Protocol Television (IPTV) channels in a layer 2 label switched network, wherein a first one of a plurality of network elements in the layer 2 label switched network is coupled with a second one of the plurality of network elements over a plurality of member links of an aggregate link, wherein the first network element transmits IPTV packets of the IPTV channels over the plurality of member links to the second network element, and wherein the first network element does not base its forwarding decision to forward IPTV packets to the second network element based on layer 3 information of those packets, comprising:
receiving a plurality of IPTV packets originating from a single source, wherein each of the received IPTV packets belongs to one of a plurality of IPTV channels; and
for each IPTV packet received, performing the following,
determining layer 3 information included in the IPTV packet,
generating one or more first channel load balancing keys based on the layer 3 information,
generating a first hash value from the first channel load balancing keys, determining which one of the plurality of member links to transmit the IPTV packet on based on the first hash value, and
transmitting the IPTV packet to the second network element on the
determined member link,
wherein each IPTV packet of a certain IPTV channel is transmitted on a same member link in the plurality of member links,
wherein transmitting the IPTV packet further includes encapsulating the IPTV packet with a label stack including one or more labels,
wherein the second network element to perform the following upon receiving channel load balanced IPTV traffic from the first network element,
for each IPTV packet received, performing the following,
determining a slot identifier and a port identifier from which the IPTV packet
was received on;
generating one or more second channel load balancing keys based on the
labels included in the IPTV packet and the slot and port identifier,
generating a second hash value from the second channel load balancing keys,
determining which of another plurality of member links to transmit the IPTV packet based on the second has value; and
transmitting the IPTV packet to the third network element on the determined member link from the another plurality of member links between the second network element and the third network element.

11. The non-transitory machine-readable storage medium of claim 10, wherein the determining layer 3 information further includes performing the following,
parsing the received IPTV packet to determine a location in the packet of layer 3 information, and
storing the location of the layer 3 information in memory.

12. The non-transitory machine-readable storage medium of claim 11, wherein parsing the packet further includes determining a location of a source IP address and a location of a destination IP address of the packet, wherein the destination IP address identities one of the IPTV channels.

13. The non-transitory machine-readable storage medium of claim 10, wherein determining which one of the plurality of member links to transmit the IPTV packet on includes using the first hash value to lookup the member link in a channel load balancing member link identifier structure.

14. The non-transitory machine-readable storage medium of claim 10, wherein each IPTV packet received on a certain slot and port is transmitted on the same member link.

15. The non-transitory machine-readable storage medium of claim 14, further comprising,
parsing the label stack to determine a location in the packet of the labels, and storing the location of the labels and the slot and port identifier.

* * * * *

UNITED STATES PATENT AND TRADEMARK OFFICE
CERTIFICATE OF CORRECTION

| | | |
|---|---|---|
| PATENT NO. | : 8,537,679 B2 | Page 1 of 1 |
| APPLICATION NO. | : 12/116954 | |
| DATED | : September 17, 2013 | |
| INVENTOR(S) | : Baruah et al. | |

It is certified that error appears in the above-identified patent and that said Letters Patent is hereby corrected as shown below:

On the Title Page, in Item (56), under "OTHER PUBLICATIONS", in Column 2, Line 1, delete "Forwading," and insert -- Forwarding, --, therefor.

On the Title Page, in Item (74), under "Attorney, Agent, or Firm", in Column 2, Lines 1-2, delete "Blakely, Sokloff, Taylor & Zafman" and
insert -- Blakely Sokloff Taylor & Zafman --, therefor.

In the Claims:

In Column 12, Line 44, in Claim 1, delete "has value;" and insert -- hash value; --, therefor.

In Column 12, Line 58, in Claim 3, delete "identities" and insert -- identifies --, therefor.

In Column 13, Line 9, in Claim 7, delete "network" and insert -- network, --, therefor.

In Column 14, Line 38, in Claim 10, delete "has value;" and insert -- hash value; --, therefor.

In Column 14, Line 53, in Claim 12, delete "identities" and insert -- identifies --, therefor.

Signed and Sealed this
Fourteenth Day of January, 2014

Michelle K. Lee
*Deputy Director of the United States Patent and Trademark Office*